US007673056B1

(12) United States Patent
Inbaraj et al.

(10) Patent No.: US 7,673,056 B1
(45) Date of Patent: Mar. 2, 2010

(54) REDIRECTION GATEWAY

(75) Inventors: Joseprabu Inbaraj, Lawrenceville, GA (US); Ramkumar Seshadri, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 271 days.

(21) Appl. No.: 11/768,969

(22) Filed: Jun. 27, 2007

(51) Int. Cl.
*G06F 15/16* (2006.01)

(52) U.S. Cl. ........................ 709/228; 709/217; 709/227

(58) Field of Classification Search ................. 709/228, 709/227, 217
See application file for complete search history.

(56) References Cited

U.S. PATENT DOCUMENTS

2004/0145605 A1* 7/2004 Basu et al. .................. 345/740
2005/0125560 A1* 6/2005 Brockway et al. ........... 709/249
2007/0074280 A1* 3/2007 Callaghan .................... 726/12
2007/0260702 A1* 11/2007 Richardson et al. ......... 709/217
2008/0270612 A1* 10/2008 Malakapalli et al. ........ 709/227

* cited by examiner

*Primary Examiner*—John Follansbee
*Assistant Examiner*—Nghi V Tran
(74) *Attorney, Agent, or Firm*—Hope Baldauff Hartman, LLC

(57) ABSTRACT

A redirection gateway is provided that bridges connections between redirection server computers and redirection client computers. The redirection gateway communicates with a redirection gateway client executing on a redirection client computer. In response to receiving a request from the redirection gateway client application, the redirection gateway establishes a connection to a redirection server application. The redirection gateway client application then causes an appropriate redirection client application for connecting to the redirection server application to be executed. The redirection gateway client application also instructs the redirection client application to connect to the redirection gateway. Once a connection between the redirection gateway and the redirection client application has been established, the redirection gateway bridges its connection to the redirection server application with its connection to the redirection client application.

12 Claims, 7 Drawing Sheets

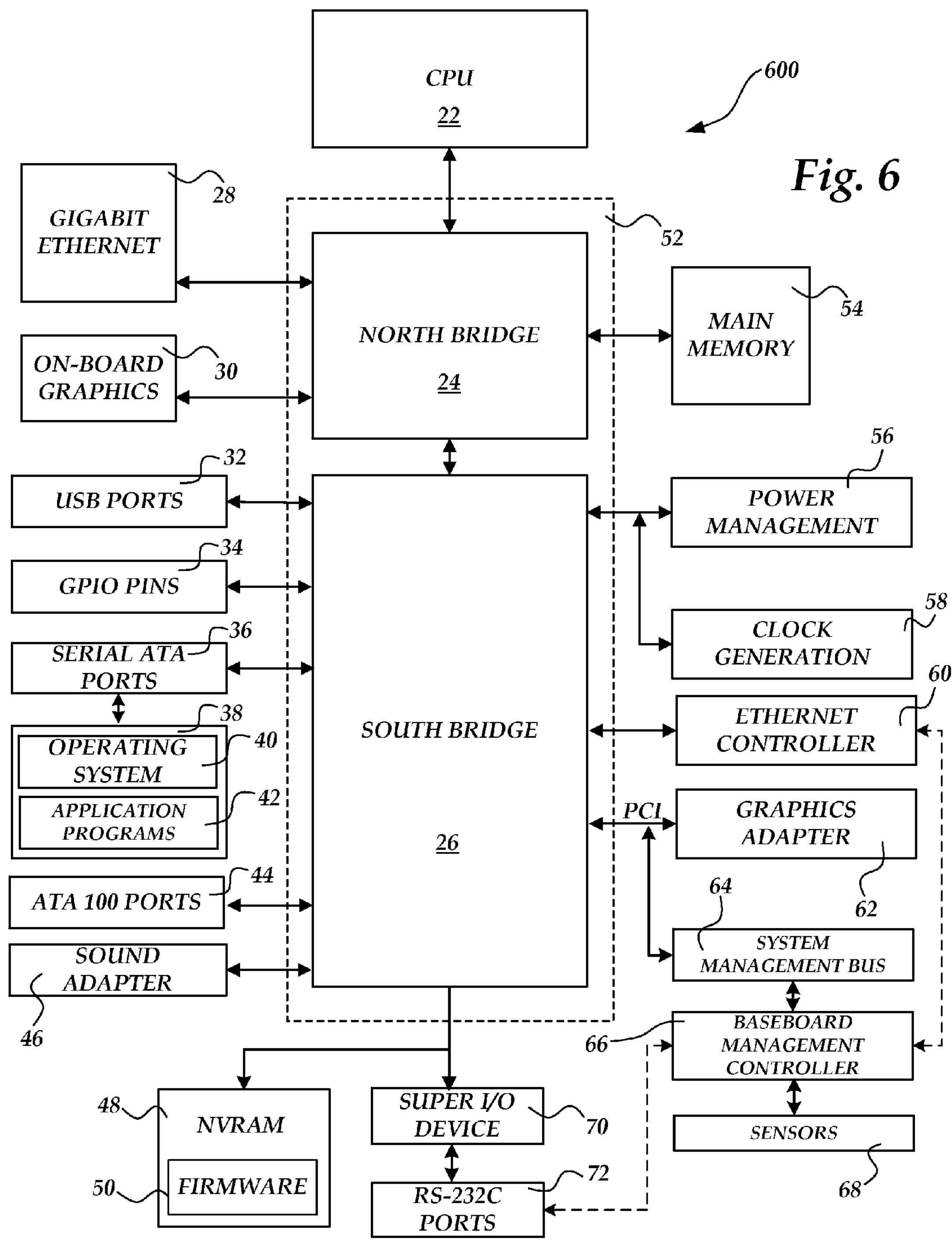

CPU
22
600
Fig. 6
GIGABIT ETHERNET
28
52
NORTH BRIDGE
24
MAIN MEMORY
54
ON-BOARD GRAPHICS
30
56
32
USB PORTS
POWER MANAGEMENT
34
GPIO PINS
58
CLOCK GENERATION
36
SERIAL ATA PORTS
60
38
ETHERNET CONTROLLER
OPERATING SYSTEM
40
SOUTH BRIDGE
APPLICATION PROGRAMS
42
PCI
GRAPHICS ADAPTER
26
44
ATA 100 PORTS
64
62
SOUND ADAPTER
SYSTEM MANAGEMENT BUS
46
66
BASEBOARD MANAGEMENT CONTROLLER
48
NVRAM
SUPER I/O DEVICE
70
SENSORS
50
FIRMWARE
72
RS-232C PORTS
68

REDIRECTION GATEWAY

BACKGROUND

Redirection programs allow the remote operation of computer systems. These solutions utilize a redirection server application program executing on a controlled computer to capture video screen application programming interface ("API") calls, and to transmit the captured calls to a redirection client application executing on a remote computer. The redirection client application replays the captured API calls so that the display is shown at the remote computer. Redirection programs also transmit keyboard and mouse data between the controlled computer and the remote computer so that a user can interact with the controlled computer as if she was located proximately to the controlled computer.

One category of redirection programs utilizes the remote desktop protocol ("RDP"). The RDP protocol is commonly utilized by computers executing the WINDOWS operating system from MICROSOFT CORPORATION of Redmond, Wash. Another category of redirection software packages utilizes the virtual network computing ("VNC") protocol. The VNC protocol is typically utilized by computer systems executing the UNIX operating system or one of its derivative operating systems. The RDP protocol and the VNC protocol are, however, incompatible. As a result, redirection client applications utilizing one of the protocols cannot communicate with redirection server applications that utilize the other protocol.

In many server installations, it is common to utilize some server computers that execute the RDC protocol for console redirection and other server computers that execute the VNC protocol for console redirection. As a result, when it is necessary to connect to a server computer via redirection, a user must manually determine the appropriate redirection client application to utilize for the connection. Often, this is performed by manually maintaining a list of all of the server computers that identifies the server computer and the type of redirection protocol utilized by each server. This can be a time consuming and error prone process.

It is with respect to these considerations and others that the various embodiments described below have been made.

SUMMARY

In accordance with the embodiments and implementations described herein, a redirection gateway apparatus is provided that bridges connections between redirection server computers and redirection client computers. Through the use of the redirection gateway and a redirection gateway client application executing on a redirection client computer, the need to manually maintain data identifying the type of redirection protocol utilized by each redirection server computer is eliminated.

According to one aspect, a redirection gateway is provided that operates in conjunction with one or more redirection server computers and one or more redirection client computers. Each redirection server computer executes a redirection server application. Each of the server computers may utilize a different, incompatible redirection protocol, such as RDP or VNC. The redirection gateway includes functionality for discovering each of the redirection server applications and for identifying the type of redirection protocol utilized by each of the discovered applications.

The redirection client computer includes a redirection gateway client application and one or more redirection client applications. The redirection client applications are utilized to establish a redirection session to an appropriate redirection server application, and may utilize different, incompatible redirection protocols. For instance, a single redirection client computer may include a RDP redirection client application, a VNC redirection client application, and a redirection client application that utilizes another type of redirection protocol.

The redirection gateway communicates with the redirection gateway client executing on the redirection client computer. In particular, the redirection gateway transmits data to the redirection gateway client that identifies the discovered redirection server applications and the type of redirection protocol utilized by each server. The redirection gateway client application then displays this information and allows the selection of one of the identified servers. In response to receiving such a selection, the redirection gateway client application transmits a request to the redirection gateway to connect to the selected redirection server application. In response to receiving the request, the redirection gateway establishes a connection to the redirection server application.

Once the connection between the redirection gateway and the redirection server application has been established, the redirection gateway client application executes the appropriate redirection client application for connecting to the redirection server application on the redirection client computer. For instance, if the redirection server application utilizes the VNC protocol, the redirection gateway client application will launch a VNC redirection client application on the redirection client computer. The redirection gateway client application will also instruct the redirection client application to connect to the redirection gateway.

Once a connection between the redirection gateway and the redirection client application has been established, the redirection gateway bridges its connection to the redirection server application with its connection to the redirection client application. Through the bridged connection provided by the gateway, data received from the redirection server application is passed to the redirection client application and data received from the redirection client application is passed to the redirection server application. The redirection gateway is transparent to both the redirection server application and the redirection client application. The redirection gateway can support many such bridged connections between redirection server applications and redirection client applications.

In order to identify the various bridged connections, the redirection server maintains data that uniquely identifies each connection. For instance, in one implementation, the redirection gateway maintains an Internet protocol ("IP") address and network socket number for the redirection gateway client application, an IP address and socket number for the redirection client application, and an IP address, network port number, and socket number for the redirection server application. The redirection gateway may also maintain a flag for each connection indicating whether the session has been established.

The subject matter described herein may also be implemented as an apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

BRIEF DESCRIPTION OF THE DRAWINGS

FIG. 6 is a computer architecture diagram that illustrates a computer architecture utilized by the various computing systems described herein.

DETAILED DESCRIPTION

Figure 1:
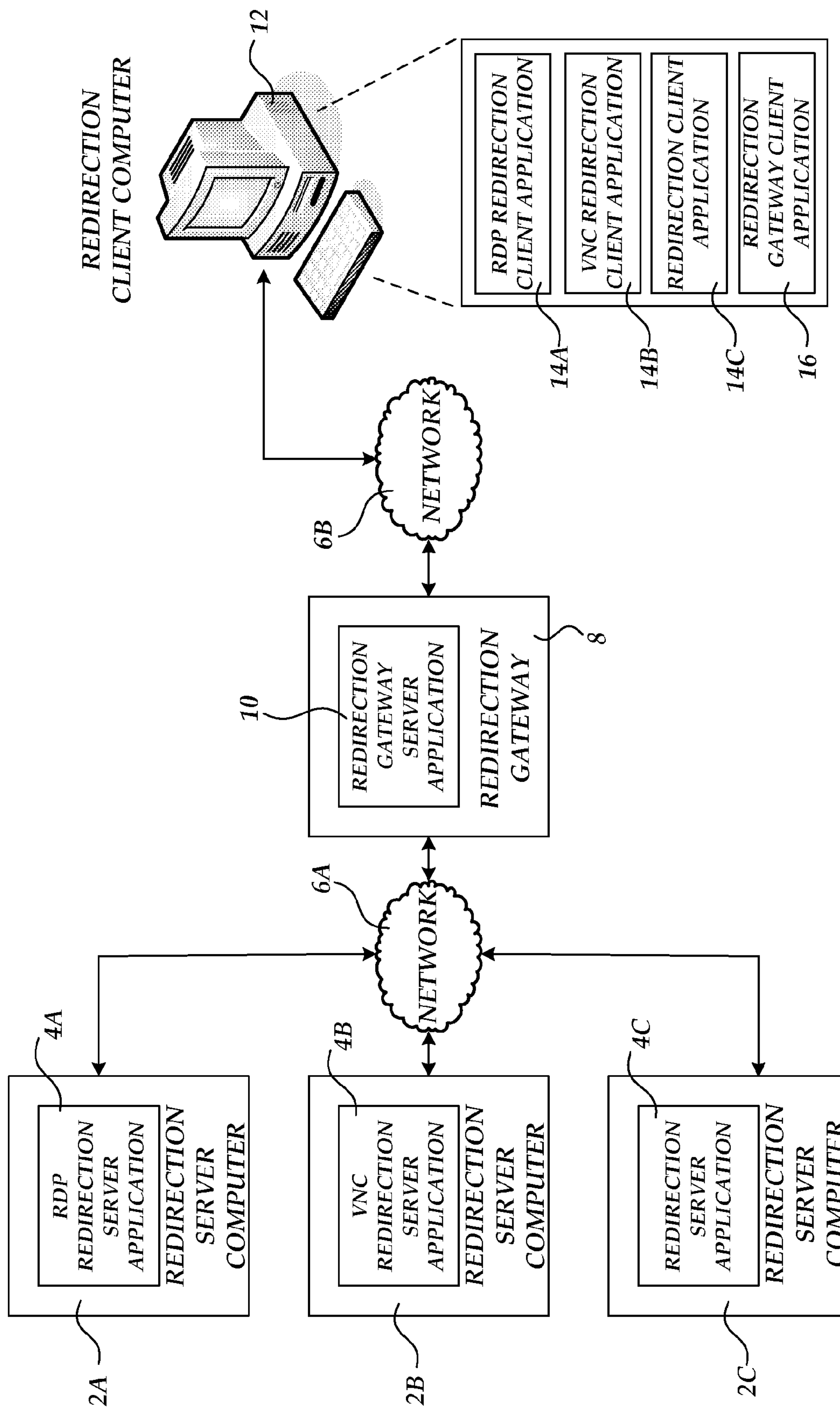
FIG. 1 is a network architecture diagram showing an illustrative operating environment for aspects of the disclosure provided herein.

Technologies are provided herein for implementing a redirection gateway. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

FIG. 1 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the embodiments presented herein will be described. As shown in FIG. 1, a redirection gateway 8 is disclosed herein that is operative to provide a bridge between one or more redirection server applications 4A-4C and one or more redirection client applications 14A-14C. As shown in FIG. 1, the redirection gateway 8 connects to one or more redirection server computers 2A-2C via a network 6A. The redirection gateway 8 also connects to a redirection client computer 12 via a network 6B. The networks 6A and 6B may comprise a local or wide area network, including the Internet, and other networks not shown in FIG. 1 may also be utilized. The networks 6A and 6B may also comprise the same network.

The redirection server computers 2A-2C comprise computing systems operative to execute redirection server applications 4A-4C. The redirection server applications 4A-4C are in-band console redirection software packages that generate remote console data once an operating system has been loaded. The redirection server applications 4A-4C communicate with a compatible redirection client application 14A-14C. Through the redirection client applications 14A-14C, screen displays generated by the server computers 2A-2C may be viewed remotely at the redirection client computer 12. Moreover, the redirection client applications 14A-14C may be utilized to control the operation of a server computer by providing mouse and keyboard input generated at the redirection client computer 12 to the controlled server computer.

It should be appreciated that server computers executing the UNIX or LINUX operating systems often utilize a virtual network computing ("VNC") redirection server application 2B. Server computers executing the WINDOWS operating system from MICROSOFT CORPORATION frequently utilize a remote desktop protocol ("RDP") redirection server application 2C. It should be appreciated that the VNC and RDP protocols perform similar functions but are incompatible. Therefore, a VNC redirection client application 14B must be utilized to connect to the VNC redirection server application 2B and a RDP redirection client application 14A must be utilized to connect to a RDP redirection server application 2A. It should also be appreciated that a redirection server application 2C and a redirection client application 14C compatible with another type of redirection protocol may also be utilized.

According to aspects of the embodiments presented herein, the redirection gateway 8 executes a redirection gateway server application 10 that provides the functionality described herein for providing a network bridge between the servers 2A-2C and the redirection client computer 12. As will be described in greater detail herein, the redirection gateway server application 10 provides functionality for discovering each of the redirection server applications 2A-2C and the type of protocol utilized by each of the applications. Data identifying each of the discovered redirection server applications and the type of redirection protocol utilized by each of the discovered applications is provided to the redirection gateway client application 16.

The redirection gateway client application 16 executes on the redirection client computer 12. The redirection gateway client application 16 is operative to communicate with the redirection gateway server application 10. In particular, the redirection gateway client application 16 is operative to provide a list of the discovered servers to a user and allow the user to select one of the servers for redirection. In response to such a selection, the redirection gateway client 16 communicates the selection to the redirection gateway server application 10. The redirection gateway server application 10 then instructs the redirection gateway application 16 to cause the appropriate redirection client application 14A-14C for connecting to the selected server to be executed. The redirection gateway server application 10 also instructs the redirection gateway client application 16 to instruct the executed redirection client application 14A-14C to establish a connection to the redirection gateway 8.

Once the appropriate redirection client application 14A-14C has established a connection to the redirection gateway 8, the redirection gateway 8 establishes a connection to the redirection server application 2A-2C executing on the selected server computer 4. When a connection has been established to the selected server computer, the redirection gateway 8 bridges its connection with the redirection client application 14A-14C with its connection to the selected server computer. In this manner, the appropriate redirection client application is executed at the redirection client computer 12 and connected to the selected server computer in an automated fashion without requiring a user to select the appropriate redirection client application 14A-14C. Multiple connections may be made in a similar manner between two or more of the redirection client applications 14A-14C and two or more of the redirection server applications 2A-2C. Additional details regarding this process will be provided below with respect to FIG. 2-6.

Figure 2:
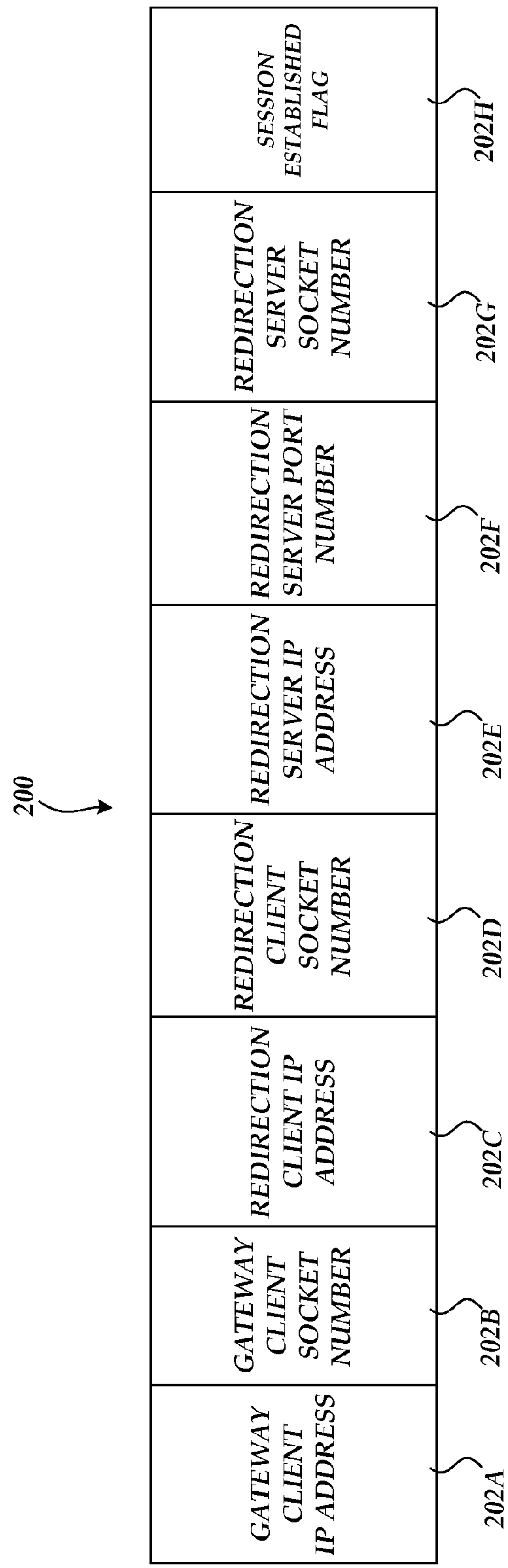
FIG. 2 is a data structure diagram showing the format of an illustrative redirection router table provided in one implementation presented herein.

Referring now to FIG. 2, details will be provided regarding a router table 200 maintained by the redirection gateway server application 10. As discussed briefly above, the redirection gateway server application 10 may maintain multiple simultaneous connections between the redirection server applications 2A-2C and the redirection client applications 14A-14C. The router table 200 is maintained by the redirection gateway server application 10 to identify each of the connections and to route data between the appropriate clients and servers. A row is created in the router table 200 for each connection.

Each row in the router table 200 includes a field 202A for storing a network address, such as an IP address, for the gateway client application 16, and a field 202B that is utilized to store data identifying the network socket number for the gateway client application 16. Each row in the router table 200 also includes a field 202C for storing the network address of the redirection client application 14 and a field 202D for storing the network socket number for the redirection client application 14. Each row in the router table 200 also includes a field 202E for storing the network address of the redirection server application 4, a field 202F for storing the network port number for the redirection server application 4, and a field 202G for storing the network socket number for the redirection server application 4. A field 202H is also present in each row of the router table 200 for storing a flag that indicates whether the corresponding session has been established. Additional details regarding the use of each of the fields 202A-202H will be provided below with respect to FIGS. 3A-5.

Figure 3A:
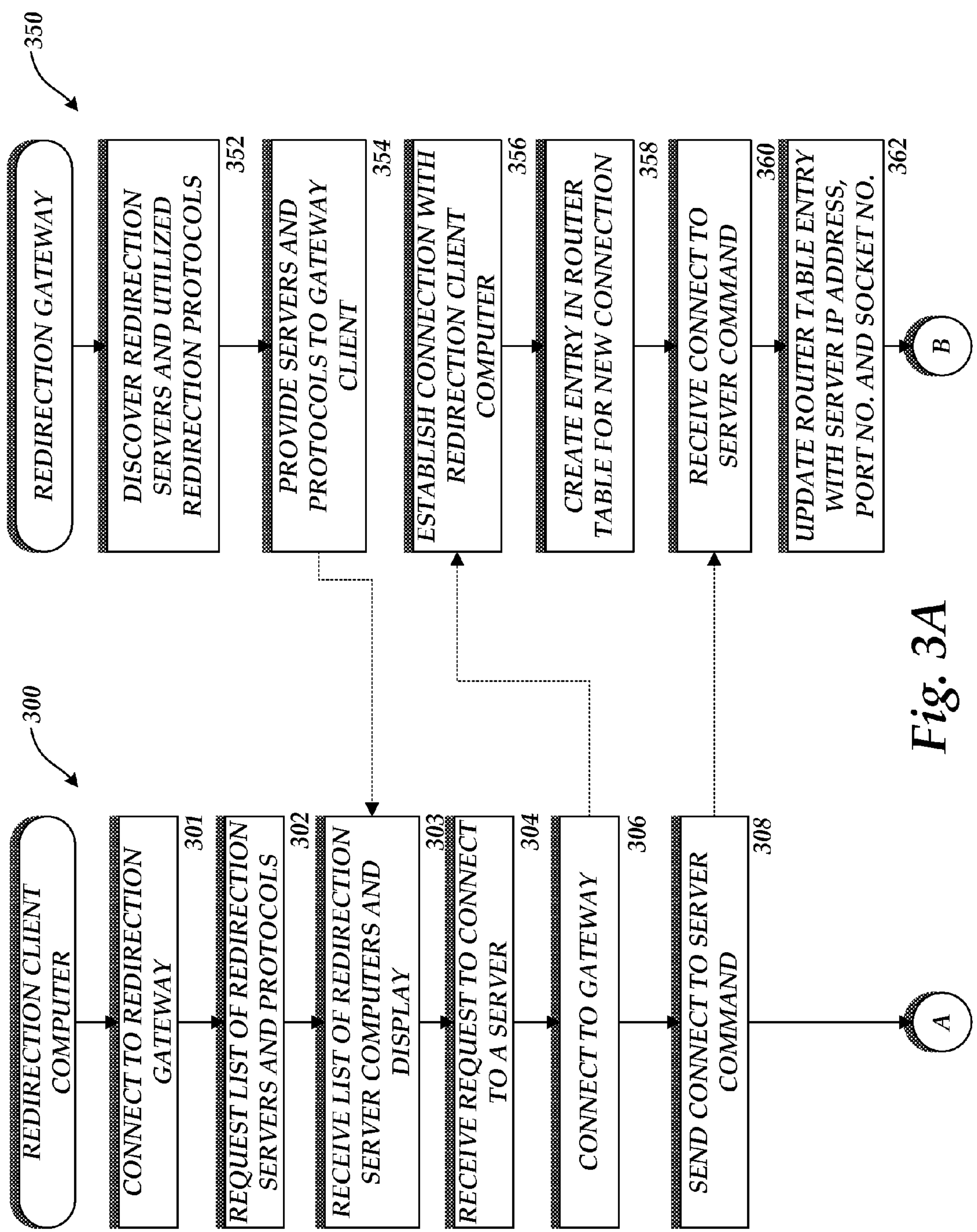
FIGS. 3A-5 are flow diagrams illustrating aspects of the operation of a redirection gateway, a redirection server computer, and a redirection client computer in one embodiment described herein.
Figure 3B:
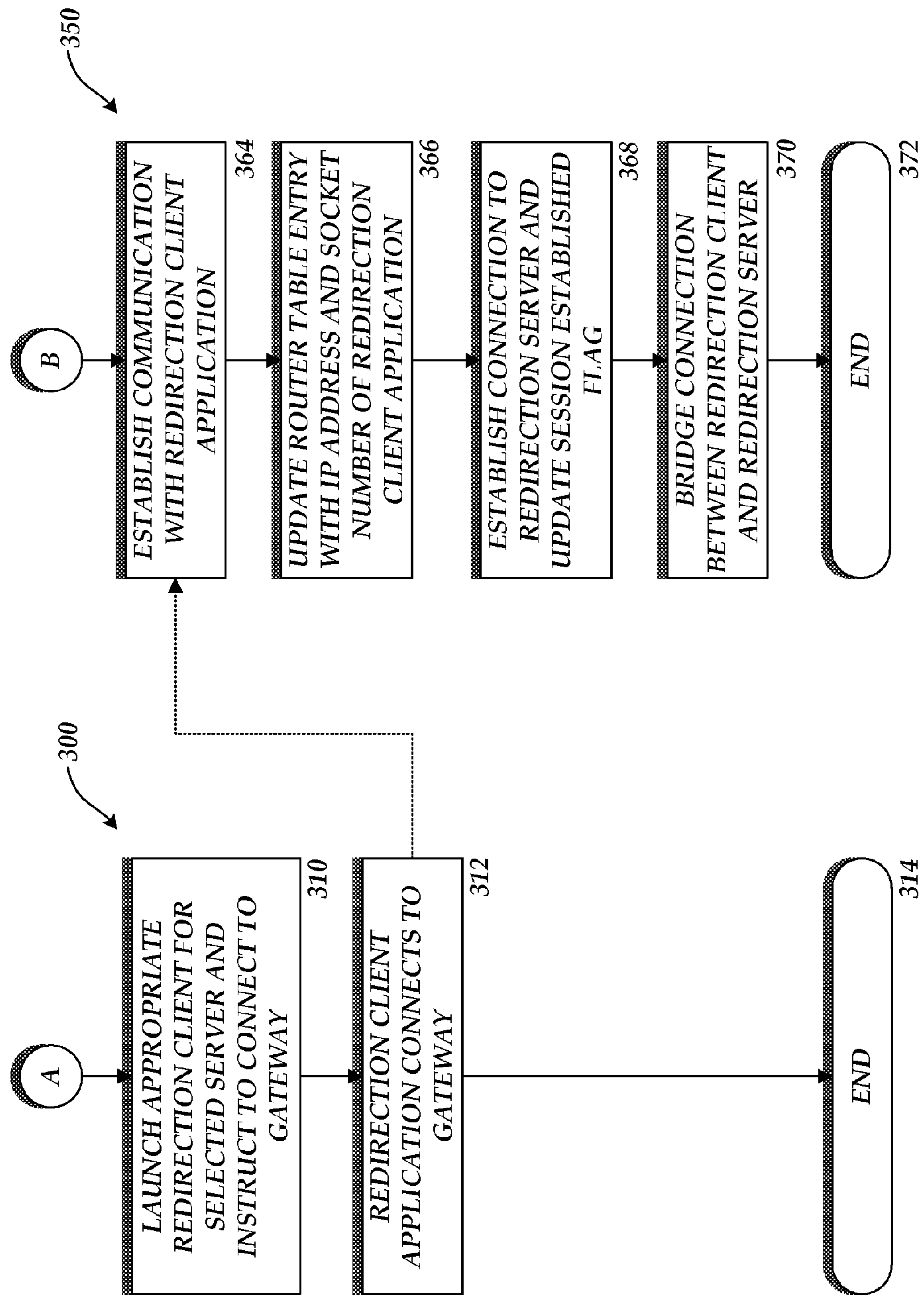

Referring now to FIGS. 3A-3B, the illustrative routines 300 and 350 will be described in detail illustrating the operation of the redirection client computer 12 and the redirection gateway 8, respectively. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto The routine 300 begins at operation 301, where the redirection client application 16 connects to the redirection gateway 8. Once a connection has been established, the redirection client application 16 requests data identifying the available redirection server computers 2A-2C and the protocols utilized by each of the identified redirection server computers. This occurs at operation 302. The routine 350 begins at operation 352, where the redirection gateway 8 discovers the redirection server computers 2A-2C and the protocol utilized by the redirection server application 4 executing on each discovered server computer. The routine 350 then continues to operation 354, where the redirection gateway 8 provides data identifying each of the discovered redirection server computers 2A-2C and the discovered protocol to the redirection gateway client application 16. The redirection gateway client application 16 receives this information at operation 303 of the routine 300.

From operation 303, the routine 300 continues to operation 304, where the redirection gateway client application 16 receives a request to initiate a redirection session with one of the discovered server computers 2A-2C. As mentioned above, the redirection gateway client application 16 may provide a user interface that includes the available server computers and that allows a user to select a server to connect with. In response to receiving such a request, the routine 300 continues to operation 306, where the redirection gateway client application 16 connects to the redirection gateway server application 10. The redirection gateway server application 10 establishes the connection with the redirection gateway client application 16 at operation 356 of the routine 350.

From operation 356, the routine 350 continues to operation 358, where the redirection gateway server application 10 creates a new entry in the router table 200 for the new connection. The redirection gateway server application 10 also inserts the IP address and socket number utilized by the redirection gateway client application 16 into the fields 202A and 202B of the router table 200, respectively. The routine 300 continues from operation 306 to operation 308, where the redirection gateway client application 16 transmits a connect to server command to the redirection gateway server application 10. This command includes the identity of the server 2A-2C with which a redirection session should be established.

The redirection gateway server application 10 receives the connect to server command at operation 360 of the routine 350. From operation 360, the routine 350 continues to operation 362, where the redirection gateway server application 10 updates the new entry in the router table 200 to reflect the network address, port number, and socket number of the server computer 2A-2C to which the connection will be established. This information is stored in the fields 202E, 202F, and 202G, respectively, of the router table 200. From operation 308, the routine 300 continues to operation 310 and from operation 362, the routine 350 continues to operation 364.

At operation 310, the redirection gateway client application 16 launches the appropriate redirection client application 14A-14C for connecting to the desired server computer 2A-2C. For instance, if the server 2A is to be connected to, the redirection gateway client application 16 will cause the RDP redirection client application 14A to be executed on the redirection client computer 12. If the server 2B is to be connected to, the redirection client application will cause the VNC redirection client application 14B to be executed. The redirection gateway client application 16 also instructs the redirection client application to establish a connection to the redirection gateway server application 10. This may include, for instance, providing the network address of the redirection server application 10 to the redirection client application. The redirection client application 14 connects to the redirection gateway 8 at operation 312 of the routine 300.

At operation 364 of the routine 350, the redirection gateway server application 10 establishes a connection with the redirection client application 14 executed by the redirection gateway client application 16. The routine 350 then continues to operation 366, where the redirection gateway server application 10 updates the router table 200 with the network address and socket number of the redirection client application 14. In particular, the network address and socket number of the redirection client application 14 are stored in the fields 202C and 202D, respectively, of the router table 200. From operation 366, the routine 350 continues to operation 368.

At operation 368, the redirection gateway server application 10 establishes a connection to the requested redirection server computer 2A-2C. Once a connection has been established to the redirection server computer 2A-2C, the redirection gateway server application 10 updates the contents of the field 202H of the router table 200 to indicate that a redirection session has been established. The routine 350 then continues to operation 370, where the redirection gateway server application 10 bridges its connection with the redirection server computer 2 to its connection with the redirection client application 14. In this manner, data received from the redirection client application 14 is provided to the redirection server application 4 and data received from the redirection server application 2 is provided to the redirection client application 14. The redirection gateway 8 is transparent to both the redirection server computer 2 and the redirection client computer 12. Additional details regarding the process of bridging the connections is provided below with respect to FIG. 5. The redirection gateway 8 continues to bridge the connections until a disconnect request is received from the redirection client application 14. At that time, the connections are disconnected and the routines 300 and 350 continue to operations 314 and 372, respectively, where they end.

Figure 4:
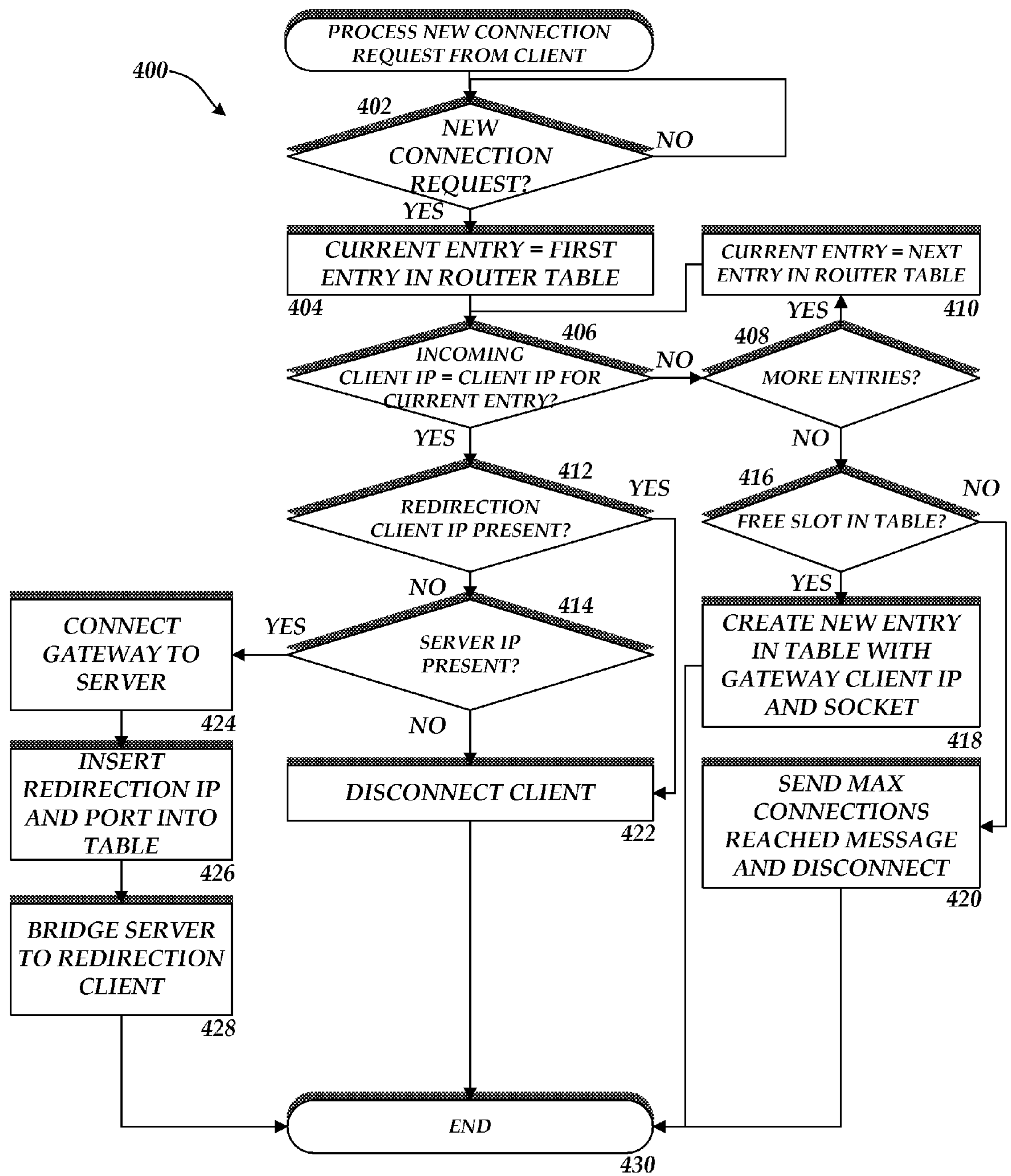

Turning now to FIG. 4, an illustrative routine 400 will be described for processing a new connection request received at the redirection gateway server application 10. A new connection request may come from the redirection gateway client application 16 when it first establishes a connection with the redirection gateway 8. A new connection request may also come from a redirection client application 14 when it establishes its connection with the redirection gateway 8. The routine 400 shown in FIG. 4 illustrates the processing performed by the redirection gateway 8 for processing these requests.

The routine 400 begins at operation 400 where the redirection gateway server application 10 determines whether a new connection request has been received. If not, the routine 400 proceeds to operation 402, where another such determination is made. If so, the routine 400 proceeds from operation 402 to operation 404, where a temporary variable utilized to maintain the value of a current entry in the router table 200 is set equal to the first entry in the router table 200. As discussed in greater detail below, this variable is utilized to step through each entry in the router table 200. From operation 404, the routine 400 continues to operation 406.

At operation 406, the redirection gateway server application 10 determines whether the network address from which the connection request was transmitted is the same as the network address stored in the field 202A for the current entry in the router table 200. If not, the routine 400 continues to operation 408, where the redirection gateway server application 10 determines whether there are additional entries in the router table 200 to be processed. If there are additional entries, the routine 400 proceeds from operation 408 to operation 410 where the current entry variable is set to the value of the next entry in the router table 200. The routine 400 then continues from operation 410 to operation 406, described above. If no additional entries are present, the routine 400 continues from operation 408 to operation 416.

At operation 416, the redirection gateway server application 10 determines whether an additional entry can be added to the router table 200. According to embodiments, the maximum number of entries permitted in the table 200 may be specified by a user. If no additional entries can be added to the table 200, the routine 400 continues from operation 416 to operation 420 where a message is returned indicating that the redirection gateway 8 has reached the maximum number of permitted connections. If an additional entry can be added, the routine 400 continues from operation 416 to operation 418 where the redirection gateway server application 10 adds a new entry to the router table 200 and populates the fields 202A and 202B of the new entry with the network address and socket number, respectively, from which the new connection request was transmitted. From operations 418 and 420, the routine 400 continues to operation 430, where it ends.

If, at operation 406, the redirection gateway server application 10 determines that the network address from which the connection request was transmitted is equal to the network address stored in the field 202A of the current entry in the router table 200, the routine 400 continues from operation 406 to operation 412. At operation 412, the redirection gateway server application 10 determines whether a network address is present in the field 202C. If so, this means that a second connection request has been transmitted from the redirection client application 14. Accordingly, in this case, the routine 400 branches to operation 422, where the current connection is disconnected. If no network address is present in the field 202C for the current entry, the routine 400 continues from operation 412 to operation 414.

At operation 414, the redirection gateway server application 10 determines whether a network address is present in the field 202E of the current entry. If not, no network address is present for the redirection server computer 2 to be connected to. Accordingly, in this case, the routine 400 continues to operation 422 where the connection is disconnected. If a network address is present in the field 202E, the routine 400 proceeds from operation 414 to operation 424. At operation 424, the redirection gateway server application 10 establishes a connection to the redirection server application 2 identified in the fields 202E, 202F, and 202G of the current entry in the router table 200. The redirection gateway server application then inserts the network address and socket number from which the connection request was transmitted into the fields 202F and 202G of the current entry in the router table 200. This occurs at operation 426. A flag is also set in the field 202H of the current entry in the router table 200 indicating that the session has been established.

From operation 426, the routine 400 proceeds to operation 428, where the redirection gateway server application 10 bridges its connection with the redirection server computer 2 with its connection to the redirection client application 14. An illustrative process for bridging the two connections will be described below with respect to FIG. 5. From operations 418, 420, 422, and 428, the routine 400 continues to operation 430, where it ends.

Figure 5:
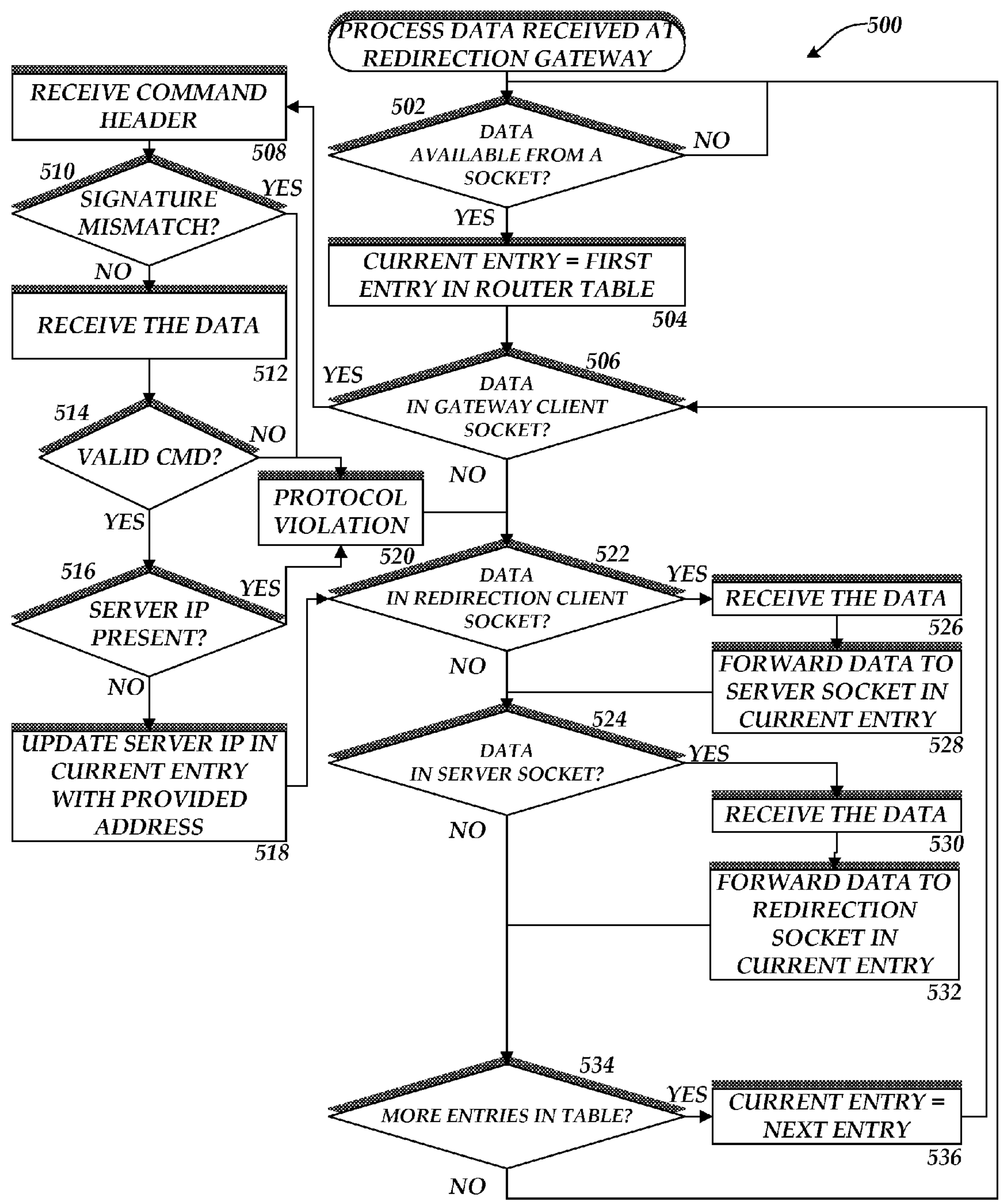

Referring now to FIG. 5, an illustrative routine 500 will be described that shows the operations performed by the redirection gateway server application 10 in one embodiment for bridging connections between redirection server computers 2A-2C and redirection client applications 14A-14C. The routine 500 begins at operation 502, where the redirection gateway server application 10 determines whether data is available from any socket. If no data is available on any socket, the routine 500 returns to operation 502. If data is available on a socket, the routine 500 continues from operation 502 to operation 504.

At operation 504, a temporary variable utilized to maintain the value of a current entry in the router table 200 is set equal to the first entry in the router table 200. The routine 500 then continues from operation 504 to operation 506, where the redirection gateway server application 10 determines whether data is available in the gateway client socket identified by the field 202B for the current entry. If so, this indicates that data has been received from the redirection gateway client application 16. In this case, the routine 500 proceeds from operation 506 to operation 508.

At operation 508, a command header is received from the redirection gateway client application 16. From operation 508, the routine 500 continues to operation 510, where the redirection gateway server application 10 determines whether the command header is properly formatted. If not, the routine 500 branches from operation 510 to operation 520, where a protocol violation is reported. If the command header is properly formatted, the routine 500 continues from operation 510 to operation 512 where the actual data for the command is received. A properly formed command message will include a valid command to the redirection gateway server application 10.

From operation 512, the routine 500 proceeds to operation 514, where the redirection gateway server application 10 determines if the received command is valid. If not, the routine 500 branches from operation 514 to operation 520, described above. If the command is valid, the routine 500 continues from operation 514 to operation 516. At operation 516, a determination is made as to whether the current entry in the router table 200 includes a server network address in the field 202E. If a server network address is already present, this indicates that a second connection request has been received, which is improper. Accordingly, in this case, the routine 500 proceeds from operation 516 to operation 520 described above. If no server network address is present in the field 202E, the routine 500 continues from operation 516 to operation 518. At operation 518, a network address provided with the current command is utilized to update the contents of the field 202E in the current entry in the router table 200. From operation 518, the routine 500 continues to operation 522.

If, at operation 506, the redirection gateway server application 10 determines that data is not present in the socket identified by the field 202B, the routine 500 continues from operation 506 to operation 522. At operation 522, the redirection gateway server application 10 determines whether data is present in the socket identified by the field 202F. If this is true, this indicates that data has been received from the redirection client application 14 for the connection identified by the current entry in the router table 200. In this case, the routine 500 branches from operation 522 to operation 526, where the data is received from the socket. The routine 500 then continues to operation 528, where the data is forwarded to the network address and port number for the connected server, identified by the contents of the fields 202E and 202F. In this way, data received from a redirection client application 14 is bridged to the appropriate redirection server computer 2. From operation 528, the routine 500 continues to operation 524.

If, at operation 522, the redirection gateway server application 10 determines that data is not present in the socket identified by the field 202D, the routine 500 continues from operation 522 to operation 524. At operation 524, the redirection gateway server application 10 determines whether data is present in the socket identified by the field 202G. If this is true, this indicates that data has been received from the redirection server application 4 for the connection identified by the current entry in the router table 200. In this case, the routine 500 branches from operation 524 to operation 530, where the data is received from the socket. The routine 500 then continues to operation 532, where the data is forwarded to the network address and port number for the connected redirection client application, identified by the contents of the fields 202C and 202D. In this way, data received from a redirection server computer 2 is bridged to the appropriate redirection client application 14. From operation 532, the routine 500 continues to operation 534.

If, at operation 524, the redirection gateway server application 10 determines that data is not present in the socket identified by the field 202G, the routine 500 continues from operation 524 to operation 534. At operation 534, the redirection gateway server application 10 determines whether additional entries are present in the router table 200. If not, the routine 500 returns to operation 502, described above. If additional entries are present in the router table 200, the routine 500 proceeds from operation 534 to operation 536. At operation 536, the redirection gateway server application 10 sets the value of the current entry variable to the next entry in the router table 200. The routine 500 then returns from operation 536 to operation 502, described above.

Turning now to FIG. 6, an illustrative computer architecture for the various computing systems utilized in the embodiments described herein will be provided. It should be appreciated that although the embodiments described herein are discussed in the context of server computers, virtually any type of computing device may be utilized. It should be appreciated that the architecture shown in FIG. 6 may be utilized to embody the redirection server computers 2A-2C, the redirection gateway 8, and the redirection client computer 12.

The illustrative architecture shown in FIG. 6 is for a computer 600 that includes a baseboard, or "motherboard", which is a printed circuit board to which a multitude of components or devices may be connected by way of a system bus or other electrical communication path. In one illustrative embodiment, a CPU 22 operates in conjunction with a chipset 52. The CPU 22 is a standard central processor that performs arithmetic and logical operations necessary for the operation of the computer. The computer 2 may include a multitude of CPUs 22.

The chipset 52 includes a north bridge 24 and a south bridge 26. The north bridge 24 provides an interface between the CPU 22 and the remainder of the computer 600. The north bridge 24 also provides an interface to a random access memory ("RAM") used as the main memory 54 in the computer 600 and, possibly, to an on-board graphics adapter 30. The north bridge 24 may also include functionality for providing networking functionality through a gigabit Ethernet adapter 28. The gigabit Ethernet adapter 28 is capable of connecting the computer 600 to another computer via a network. Connections which may be made by the network adapter 28 may include LAN or WAN connections. LAN and WAN networking environments are commonplace in offices, enterprise-wide computer networks, intranets, and the Internet. The north bridge 24 is connected to the south bridge 26.

The south bridge 26 is responsible for controlling many of the input/output functions of the computer 600. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 600. Additional details regarding the operation of the system management bus 64 and its connected components are provided below.

The south bridge 26 is also operative to provide one or more interfaces for connecting mass storage devices to the computer 600. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs 42, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

The mass storage devices connected to the south bridge 26, and their associated computer-readable media, provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 26 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 600 and to transfer information between elements within the computer 600.

As described briefly above, the south bridge 26 may include a system management bus 64. The system management bus 64 may include a BMC 66. In general, the BMC 66 is a microcontroller that monitors operation of the computer system 600. In a more specific embodiment, the BMC 66 monitors health-related aspects associated with the computer system 600, such as, but not limited to, the temperature of one or more components of the computer system 600, speed of rotational components (e.g., spindle motor, CPU Fan, etc.) within the system, the voltage across or applied to one or more components within the system 600, and the available or used capacity of memory devices within the system 600. To accomplish these monitoring functions, the BMC 66 is communicatively connected to one or more components by way of the management bus 64. In an embodiment, these components include sensor devices for measuring various operating and performance-related parameters within the computer system 600.

The management bus 64 is used by the BMC 66 to request and/or receive various operating and performance-related parameters from one or more components, which are also communicatively connected to the management bus 64. For instance, in one embodiment, the management bus 64 may communicatively connects the BMC 66 to a CPU temperature sensor and a CPU fan (not shown in FIG. 6), thereby providing a means for the BMC 66 to monitor and/or control operation of these components. The BMC 66 may also include sensors 68 connected directly thereto. The serial ports 72 and the Ethernet controller 60 may be utilized to establish a connection with the BMC 66.

It should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that embodiments described herein provide technologies for providing a redirection gateway. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A computer-implemented method for providing a gateway between one or more redirection client applications and one or more redirection server applications, the method comprising:

at the gateway:

establishing a connection from the redirection gateway client application to connect to a first redirection server application, the first redirection server application supporting a first redirection protocol;

in response to the request, establishing a connection to the first redirection server application;

establishing a connection to a first redirection client application, the first redirection client application supporting the first redirection protocol;

bridging the connection to the first redirection server application with the connection to the first redirection client application;

receiving a request from the redirection gateway client application to connect to a second redirection server application, the second redirection server application supporting a second redirection protocol incompatible with the first redirection protocol;

in response to receiving the request to connect to the second redirection server application, establishing a connection to the second redirection server application;

establishing a connection to a second redirection client application, the second redirection client application supporting the second redirection protocol; and bridging the connection to the second redirection server application with the connection to the second redirection client application, wherein the first redirection protocol comprises the remote desktop protocol (RDP) and the second redirection protocol comprises the virtual network computing (VNC) protocol.

2. The method of claim 1, wherein the redirection gateway client application is operative to cause the first redirection client application and the second redirection client application to be executed on a client computer.

3. The method of claim 2, further comprising storing data identifying a network address for the first redirection server application, data identifying a network address for the second redirection server application, data identifying a network address for the redirection gateway client application, a network address for the first redirection client application, and a network address for the second redirection client application.

4. The method of claim 3, further comprising discovering the redirection server applications and providing data identifying the redirection server applications to the redirection gateway client application.

5. A non-transitory computer-readable storage media having computer-executable instruction stored thereon which, when executed by a computer, cause the computer to perform the method of claim 1.

6. A system for providing a gateway between one or more redirection server applications and one or more redirection client applications, the system comprising:

a redirection gateway operative to;

receive a first connection request from a redirection gateway client application;

establish a connection to a first redirection server application in response to the first connection request, the first redirection server application supporting a first redirection protocol;

establish a connection to a first redirection client application supporting the first redirection protocol;

bridge the connection to the first redirection server application with the connection to the first redirection client application;

receive a second connection request from the gateway client application;

establish a connection request to a second redirection server application in response to the second connection request, wherein the second redirection server application supporting a second redirection protocol incompatible with the first redirection protocol;

establish a connection to a second redirection client application supporting the second redirection protocol; and bridge the connection to the second redirection server application with the connection to the second redirection client application; and a redirection gateway client application operative to;

establish a connection with the redirection gateway;

transmit the first connection request and the second connection request to the redirection gateway; and cause the execution of the first redirection client application and the second redirection client application, wherein the first redirection protocol comprises the remote desktop protocol (RDP) and the second redirection protocol comprises the virtual network computing (VNC) protocol.

7. The system of claim 6, wherein the redirection gateway is further operative to maintain data identifying a network address of the first redirection server application, the second redirection server application, the network address of the redirection gateway client application, the first redirection client application, and the second redirection client application.

8. The system of claim 6, wherein the redirection gateway is further operative to discover the redirection server applications and a redirection protocol utilized by each of the redirection server applications and to provide data identifying the redirection server applications and the redirection protocol utilized by each of the redirection server applications to the redirection gateway client application.

9. An apparatus for providing a gateway between one or more redirection server applications and one or more redirection client applications, the system apparatus comprising:

a network interface;

a memory storing a redirection gateway server application, the redirection gateway server application operative to:

establish a connection with a redirection gateway client application via the network interface;

receive a first request from the redirection gateway client application to connect to a first redirection server application, wherein the first redirection server application supporting a first redirection protocol;

establish a connection to the first redirection server application in response to the first request;

establish a connection to a first redirection client application compatible with the first redirection protocol;

bridge the connection to the first redirection server application with the connection to the first redirection client application;

receive a second request from the redirection gateway client application to connect to a second redirection server application, wherein the second redirection server application supporting a second redirection protocol incompatible with the first protocol;

establish a connection to the second redirection server application in response to second request;

establish a connection to a second redirection client application compatible with the second redirection protocol and;

bridge the connection to the second redirection server application with the connection to the second redirection client application, wherein the first redirection protocol comprises the remote desktop protocol (RDP) and the second redirection protocol comprises the virtual network computing (VNC) protocol; and a central processing unit for executing the redirection gateway server application from the memory.

10. The apparatus of claim 9, wherein the redirection gateway client application is operative to cause the first redirection client application and the second redirection client application to be executed on a client computer.

11. The apparatus of claim 10, wherein the redirection gateway server application is further operative to store data identifying a network address for the first redirection server application, the second redirection server application, data identifying a network address for the redirection gateway client application, and a network address for the first redirection client application and a network address for the second redirection client application in the memory.

12. The apparatus of claim 11, wherein the redirection gateway server application is further operative to discover the redirection server applications and to provide data identifying the redirection server applications to the redirection gateway client application.

* * * * *